US011553069B2

(12) United States Patent
Han et al.

(10) Patent No.: US 11,553,069 B2
(45) Date of Patent: Jan. 10, 2023

(54) ELECTRONIC DEVICE INCLUDING ROTATABLE CAMERA

(71) Applicant: Samsung Electronics Co., Ltd., Gyeonggi-do (KR)

(72) Inventors: Yonghwa Han, Gyeonggi-do (KR); Chungkeun Yoo, Gyeonggi-do (KR); Chulho Bae, Gyeonggi-do (KR); Chaeyang Cho, Gyeonggi-do (KR); Hongmoon Chun, Gyeonggi-do (KR)

(73) Assignee: Samsung Electronics Co., Ltd

( * ) Notice: Subject to any disclaimer, the term of this patent is extended or adjusted under 35 U.S.C. 154(b) by 303 days.

(21) Appl. No.: 16/838,457

(22) Filed: Apr. 2, 2020

(65) Prior Publication Data

US 2020/0329131 A1 Oct. 15, 2020

(30) Foreign Application Priority Data

Apr. 9, 2019 (KR) .......................... 10-2019-0041342

(51) Int. Cl.
*H04M 1/02* (2006.01)
*H04N 5/225* (2006.01)
*G06F 1/16* (2006.01)

(52) U.S. Cl.
CPC ........ *H04M 1/0264* (2013.01); *G06F 1/1605* (2013.01); *H04N 5/2257* (2013.01); *H04M 2250/20* (2013.01); *H04N 5/2252* (2013.01)

(58) Field of Classification Search
CPC ........... H04M 1/0264; H04M 2250/20; H04M 1/0237; G06F 1/1605; G06F 1/1658;
(Continued)

(56) References Cited

U.S. PATENT DOCUMENTS 10,686,971 B1 * 6/2020 Yoo ..................... H04N 5/2252
2005/0049019 A1 3/2005 Lee
(Continued)

FOREIGN PATENT DOCUMENTS

CN 1645875 7/2005
CN 1941795 4/2007
(Continued)

OTHER PUBLICATIONS

European Search Report dated Nov. 18, 2021 issued in counterpart application No. 20788629.2-1208, 24 pages.
(Continued)

*Primary Examiner* — Lester G Kincaid
*Assistant Examiner* — Maryam Soltanzadeh
(74) *Attorney, Agent, or Firm* — The Farrell Law Firm, P.C.

(57) ABSTRACT

According to various embodiments, an electronic device may include a housing, a display, an opening, a slide portion configured to slide with respect to the housing, a camera module unit configured to rotate in association with an operation of the slide portion within the opening, and a sliding motion controller configured to implement a slide operation of the slide portion and a rotation operation of the camera module unit. The sliding motion controller includes a sliding plate coupled to the slide portion to slide together, a rack gear rail disposed in a sliding direction of the slide portion and configured to move together with the slide portion by a first length and having a gear formed at one end thereof, a locking hook protruded from the other end of the rack gear rail so as to intersect a sliding direction of the rack gear rail, and a locking guide formed to correspond to a position of the locking hook and coupled to the locking hook.

20 Claims, 11 Drawing Sheets

(58) Field of Classification Search
CPC .. G06F 1/1686; H04N 5/2257; H04N 5/2252; H04N 5/2251
See application file for complete search history.

(56) References Cited

U.S. PATENT DOCUMENTS

| | | |
|---|---|---|
| 2007/0013555 A1 | 1/2007 | Sung et al. |
| 2015/0241925 A1 | 8/2015 | Seo et al. |
| 2016/0205293 A1 | 7/2016 | Jung et al. |
| 2018/0166809 A1* | 6/2018 | Brogan ............... H01R 12/714 |
| 2019/0116248 A1* | 4/2019 | Chen ................... H04M 1/0237 |
| 2019/0124186 A1* | 4/2019 | Zeng ................... H04M 1/0235 |
| 2019/0250667 A1* | 8/2019 | Fan ..................... H04M 1/0237 |
| 2019/0302841 A1* | 10/2019 | Sun ..................... G06F 1/1637 |
| 2020/0154005 A1 | 5/2020 | Han et al. |

FOREIGN PATENT DOCUMENTS

| | | |
|---|---|---|
| CN | 107888809 | 4/2018 |
| EP | 3 651 446 | 5/2020 |
| KR | 10-2006-0035478 | 4/2006 |
| KR | 20-0414532 | 4/2006 |
| KR | 10-2007-0068726 | 7/2007 |
| KR | 1020150029219 | 3/2015 |
| KR | 1727971 | 4/2017 |

OTHER PUBLICATIONS

International Search Report dated Jun. 12, 2020 issued in counterpart application No. PCT/KR2020/002864, 9 pages.

* cited by examiner

ELECTRONIC DEVICE INCLUDING ROTATABLE CAMERA

CROSS-REFERENCE TO RELATED APPLICATION(S)

This application is based on and claims priority under 35 U.S.C. 119 to Korean Patent Application No. 10-2019-0041342, filed on Apr. 9, 2019, in the Korean Intellectual Property Office, the disclosures of which are herein incorporated by reference in their entireties.

TECHNICAL FIELD

Various embodiments of the disclosure relate to an electronic device including a rotatable camera.

BACKGROUND

Recently developed electronic devices perform not only a communication function but also a function as an image photographing device. With the rapid development of hardware performance, the performance of a camera module received in the electronic device is also rapidly developing, and the camera module may take a high-resolution image or video as is taken by a professional image photographing device.

As electronic devices become thinner and areas occupied by displays increase, various studies for an effective space disposition of components (e.g., camera modules) of electronic devices are being actively conducted.

SUMMARY

Various embodiments of the disclosure may provide an electronic device capable of using one camera module as a front camera and as a rear camera.

Various embodiments of the disclosure may provide an electronic device capable of providing a fixing structure that can fix a slide portion even when an unexpected external force is applied in a process of converting a camera module to a front camera and to a rear camera.

According to various embodiments of the disclosure, an electronic device includes a housing; a display received in the housing and exposed through a portion of the housing; a slide portion including an opening exposed to the outside and configured to slide with respect to the housing; a camera module unit disposed at the opening, configured to rotate within the opening, and to rotate in association with an operation of the slide portion; and a sliding motion controller configured to implement a slide operation of the slide portion and a rotation operation of the camera module unit, wherein the sliding motion controller includes a sliding plate coupled to the slide portion to slide together; a rack gear rail disposed in a sliding direction of the slide portion and configured to move together with the slide portion by a first length and having a gear formed at one end thereof; a locking hook protruded from the other end of the rack gear rail so as to intersect a sliding direction of the rack gear rail; and a locking guide formed to correspond to a position of the locking hook and coupled to the locking hook.

According to various embodiments of the disclosure, an electronic device includes a housing including a first surface facing in a first direction and a second surface facing in a second direction opposite to the first direction, wherein the first surface includes a first side having a substantially quadrangular shape and extended in a third direction and having a first length and a second side extended in a fourth direction substantially perpendicular to the third direction and having a second length, and the second surface includes a third side having a quadrangular shape having an area smaller than that of the quadrangle and parallel to the first side and having the first length and a fourth side parallel to the second side and having a third length smaller than the second length; a display disposed inside the housing and visible through the first surface; a camera structure slidable in the fourth direction between a first position and a second position, wherein the camera structure includes a third surface forming a surface substantially extended to the second surface, wherein the third surface includes a fifth side substantially aligned with or adjacent to the first side, and a sixth side substantially in contact with or adjacent to the third side when viewed from above the second surface at the first position, at least one image sensor facing in the second direction at the first position and rotatable to face in the first direction at the second position, wherein the first side is positioned between the third side and the fifth side at the second position when viewed from above the second surface; a drive structure disposed inside the housing and configured to move the camera structure in the fourth direction; a first pinion gear coupled to the camera structure while being rotatable along a first path in the fourth direction; a first rack gear engaged with the first pinion gear while being extended along the first path; a first shaft coupled to or integrally formed with the first rack gear while being extended in the fourth direction; a first hook member connected to the first shaft while being movable in the third direction with respect to the first shaft, wherein the first hook member includes a first structure protruded from an area of the first shaft in the third direction and a second structure protruded in the first direction or the second direction when viewed from the second surface; and a first rail structure coupled to the camera structure and configured to slidably receive the first shaft, wherein the first rail structure includes a first guide structure configured to guide the second structure such that the first hook member first moves in the fourth direction and then moves in the third direction while the camera structure moves from the second position to the first position.

BRIEF DESCRIPTION OF THE DRAWINGS

In the drawings, the same or similar reference numerals may be used for the same or similar components.

DETAILED DESCRIPTION

Figure 1:
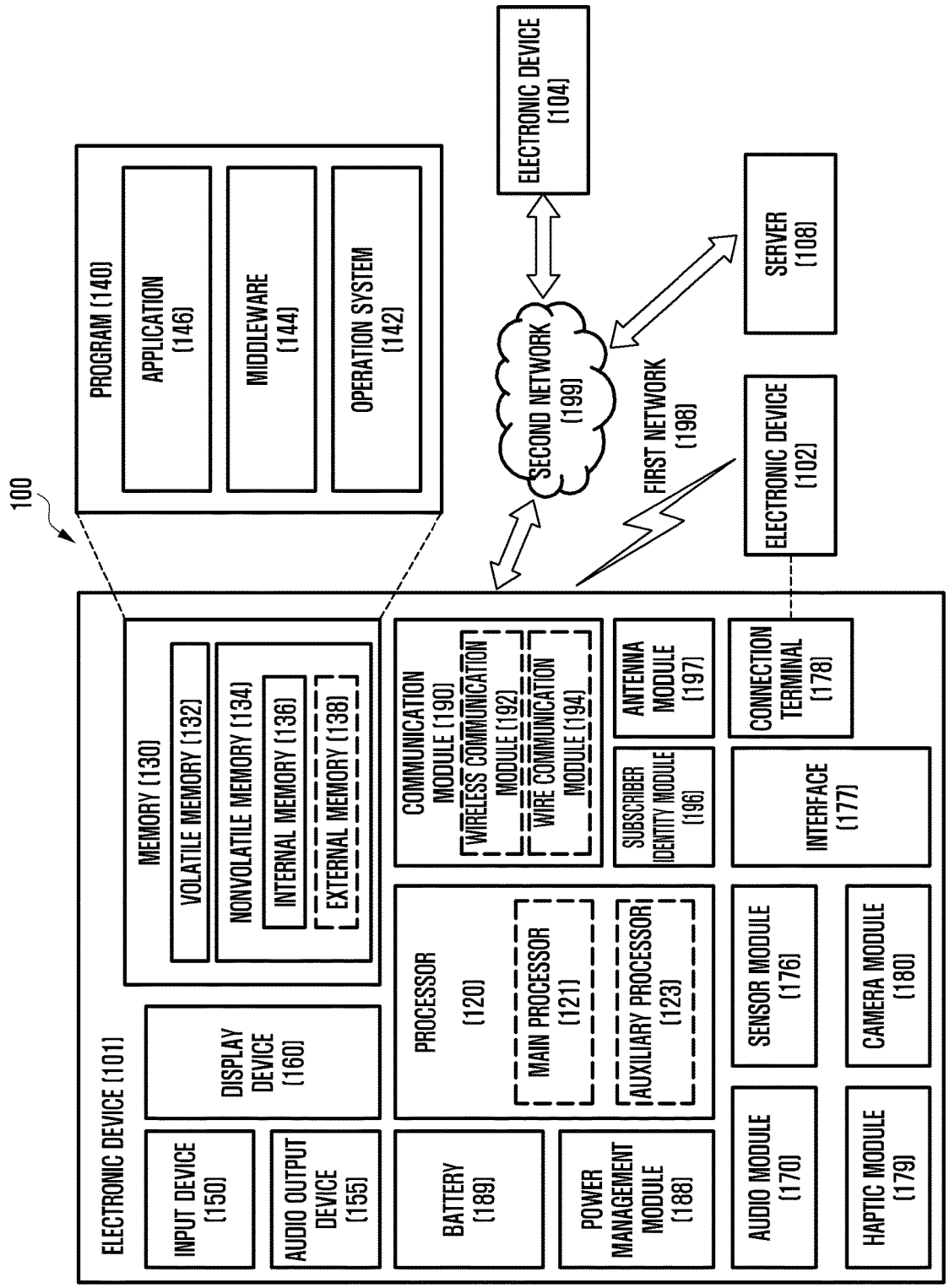
FIG. 1 is a block diagram illustrating a configuration of an electronic device in a network environment according to various embodiments.

FIG. 1 illustrates an electronic device in a network environment according to an embodiment.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. (not shown) The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. At least one of the components may be omitted from the electronic device 101, or one or more other components may be added in the electronic device 101. Some of the components may be implemented as single integrated circuitry. For example, the sensor module 176 may be implemented as embedded in the display device 160.

The processor 120 may execute a program 140 to control at least one other hardware or software component of the electronic device 101 coupled with the processor 120, and may perform various data processing or computation. As at least part of the data processing or computation, the processor 120 may load a command or data received from another component in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component among the components of the electronic device 101, instead of the main processor 121 while the main processor 121 is in an inactive (e.g., sleep) state, or together with the main processor 121 while the main processor 121 is in an active state. The auxiliary processor 123 (e.g., an image signal processor (ISP) or a CP) may be implemented as part of another component (e.g., the camera module 180 or the communication module 190) functionally related to the auxiliary processor 123.

The memory 130 may store various data used by at least one component of the electronic device 101, such as the program 140 and input data or output data for a command related thereto. The memory 130 may include the volatile memory 132 or the non-volatile memory 134.

The program 140 may be stored in the memory 130 as software and may include an operating system (OS) 142, middleware 144, and applications 146.

The input device 150 may receive a command or data to be used by the processor 120 of the electronic device 101, from the outside (e.g., a user) of the electronic device 101. The input device 150 may include a microphone, a mouse, a keyboard, or a digital pen.

The audio output device 155 may output sound signals to the outside of the electronic device 101 and may include a speaker or a receiver. The speaker may be used for general purposes, such as playing multimedia or playing record, and the receiver may be used for receiving incoming calls. The receiver may be implemented as separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and an illuminance sensor.

The interface 177 may support one or more specified protocols to be used for the electronic device 101 to be coupled with the external electronic device 102 directly (e.g., wiredly) or wirelessly. The interface 177 may include a high definition multimedia interface (HDMI), a universal serial bus (USB) interface, a secure digital (SD) card interface, or an audio interface.

A connection terminal 178 may include a connector via which the electronic device 101 may be physically connected with the external electronic device 102. The connection terminal 178 may include an HDMI connector, a USB connector, an SD card connector, or an audio connector.

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of a power management integrated circuit (PMIC).

The battery 189 may supply power to at least one component of the electronic device 101 and may include a primary cell which is not rechargeable, a secondary cell which is rechargeable, or a fuel cell.

The communication module 190 may support establishing a direct communication channel or a wireless communication channel between the electronic device 101 and the external electronic device and performing communication via the established communication channel. The communication module 190 may include one or more communication processors that are operable independently from the processor 120 (e.g., the AP) and supports a direct communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)).

These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., an international mobile subscriber identity (IMSI)) stored in the SIM 196.

The antenna module 197 may transmit or receive a signal or power to or from the external electronic device. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected by the communication module 190 from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud, distributed, or client-server computing technology may be used, for example.

An electronic device according to an embodiment may be one of various types of electronic devices, including, but not limited to a portable communication device (e.g., a smart phone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2A:
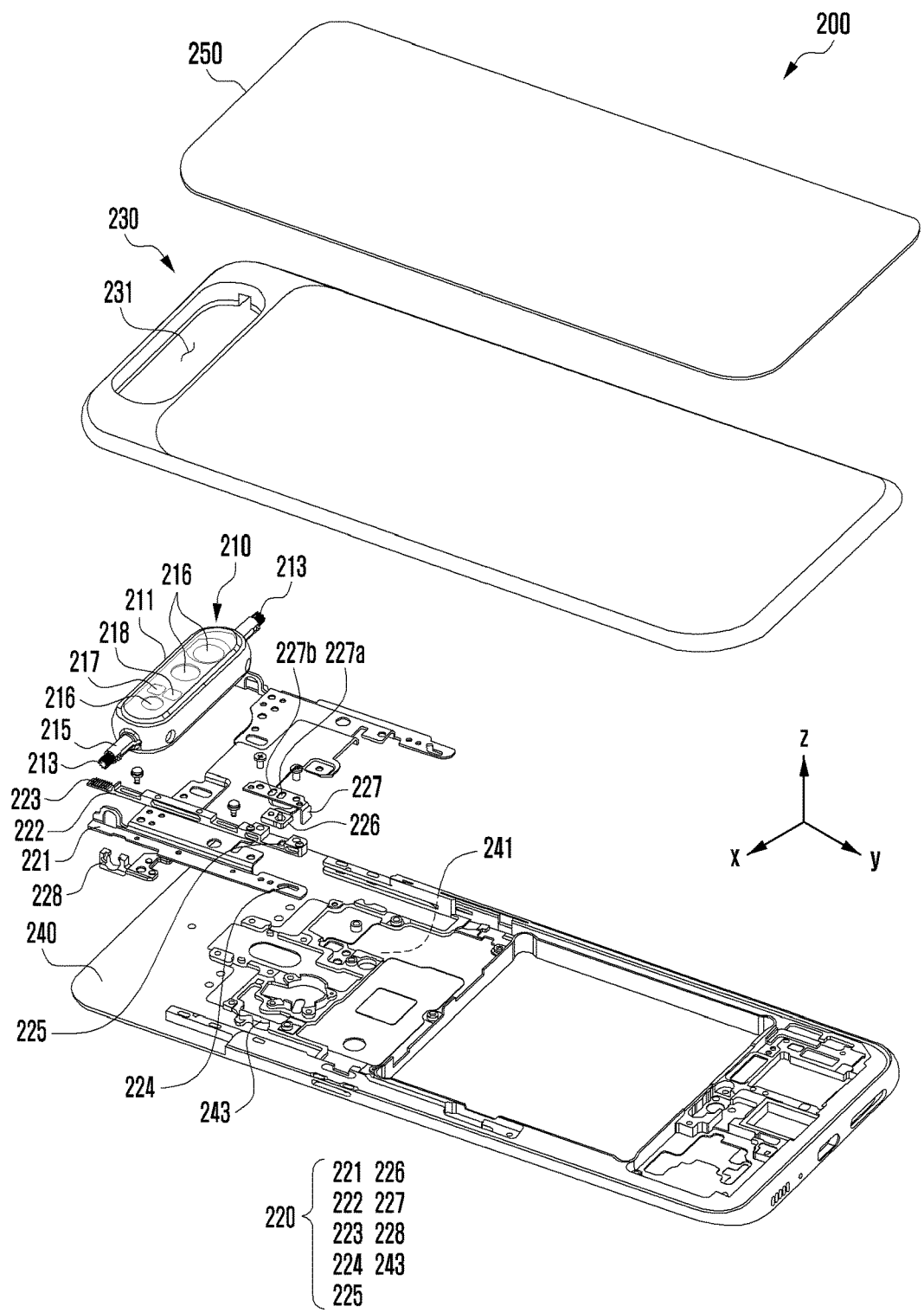
FIG. 2A is an exploded perspective view illustrating an electronic device including a rotatable camera according to an embodiment of the disclosure.
Figure 2B:
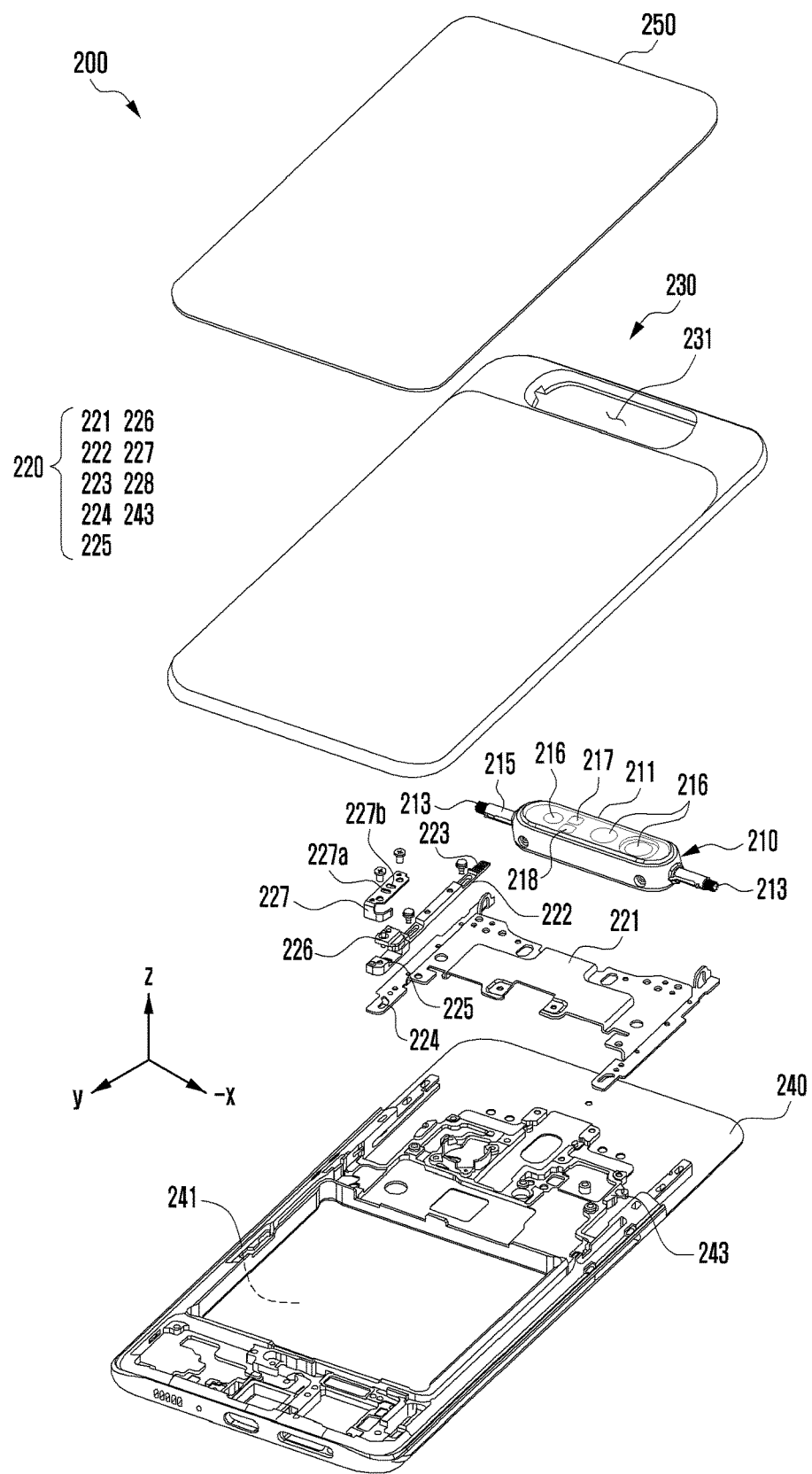
FIG. 2B is an exploded perspective view illustrating an electronic device including a rotatable camera at different angles according to an embodiment of the disclosure.
Figure 3A:
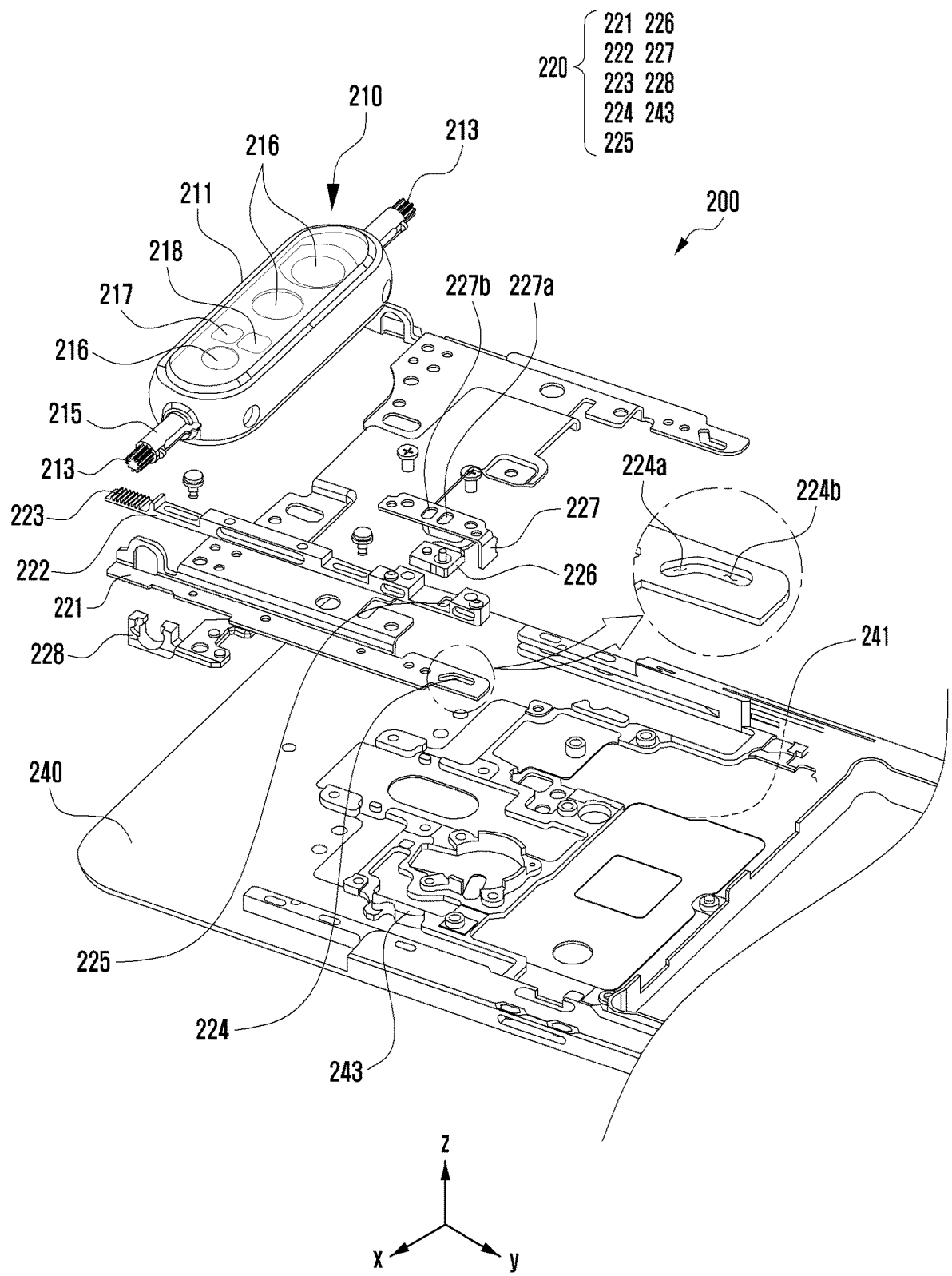
FIGS. 3A and 3B are enlarged views illustrating a sliding motion controller of FIGS. 2A and 2B.
Figure 3B:
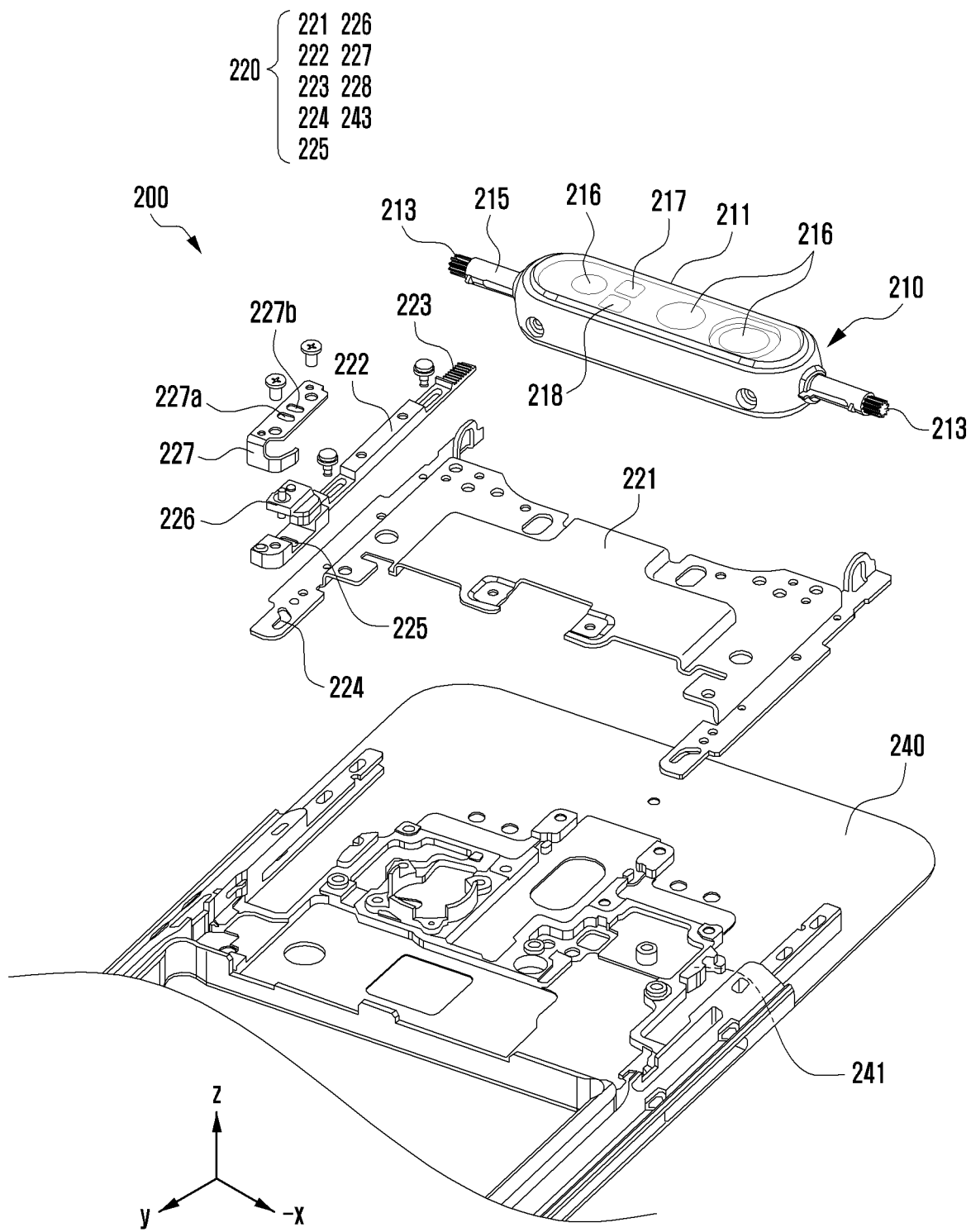

FIGS. 2A and 2B are exploded perspective views illustrating electronic devices 200 including a rotatable camera at different angles according to an embodiment of the disclosure, and FIGS. 3A and 3B are enlarged views illustrating sliding motion controllers 220 of FIGS. 2A and 2B.

In describing the electronic device 200 according to various embodiments of the disclosure, the same or similar reference numerals may be used for the same or similar elements. In describing the electronic device 200 according to various embodiments of the disclosure, a first direction may mean a −y direction, and a second direction may mean a y direction. In other words, the first direction is a direction (e.g., −y direction) toward the upper end of the electronic device 200, and the upper end of the electronic device 200 may mean the upper left end of the electronic device 200 based on the illustrated state of FIG. 2A. The second direction is a direction (e.g., y direction) toward the lower end of the electronic device 200, and the lower end of the electronic device 200 may mean the lower right end based on the illustrated state of FIG. 2A. A third direction is a z direction or a direction toward a rear surface of the electronic device 200 and may mean a direction toward the upper side based on the illustrated state of FIG. 2A, and a fourth direction is a −z direction or a direction toward a front surface of the electronic device 200 and may mean a direction toward the lower side based on the illustrated state of FIG. 2A. A lateral direction is a left and right direction (e.g., x-axis direction) of the electronic device 200 and may mean a lower left direction or an upper right direction based on the illustrated state of FIG. 2A.

With reference to FIGS. 2A and 3B, the electronic device 200 (e.g., the electronic device 101 of FIG. 1) according to an embodiment of the disclosure may include a camera module unit 210 (e.g., the camera module 180 of FIG. 1), a sliding motion controller 220, a slide portion 230, a slide driver (not illustrated), a screen unit 240, and a rear cover 250. Further, the electronic device 200 according to an embodiment may include one or more other components.

The electronic device 200 according to an embodiment of the disclosure may include a housing 250 including a camera module unit 210, a sliding motion controller 220, a slide portion 230, a slide driver (not illustrated), a screen unit 240, and a rear cover 250. The housing according to various embodiments of the disclosure may refer to a structure for protecting various electronic components forming an external shape of the electronic device 200 and mounted in the electronic device 200. Alternatively, the housing may include an internal structure of the electronic device 200.

The camera module unit 210 according to an embodiment of the disclosure may include at least one camera device 216, a flash 217, or a sensor module 218. The camera module unit 210 according to an embodiment may include the camera module 180 of FIG. 1. At least one camera device 216 may include one or a plurality of lenses, an image sensor, and/or an image signal processor. The flash 217 may include, for example, a light emitting diode or a xenon lamp. The sensor module 218 may generate an electrical signal or a data value corresponding to an operating state inside the electronic device 200 or an external environment state thereof. The sensor module 218 may include, for example, a proximity sensor, an illuminance sensor, and a heart rate monitoring (HRM) sensor.

The electronic device 200 according to various embodiments of the disclosure may further include at least one of a sensor module (not illustrated), for example, a gesture sensor, gyro sensor, atmospheric pressure sensor, magnetic sensor, acceleration sensor, grip sensor, color sensor, infrared (IR) sensor, biometric sensor, temperature sensor, humidity sensor, or fingerprint sensor.

The camera module unit 210 according to an embodiment of the disclosure may include a camera housing 211 including at least one camera device 216, a flash 217, or a sensor module 218. The camera housing 211 according to an embodiment may include a pinion gear 213 in at least one side surface thereof. The pinion gear 213 according to an embodiment may be symmetrically disposed at both sides of the camera housing 211. An extension portion 215 may be disposed between the camera housing 211 and the pinion gear 213. The extension portion 215 and the pinion gear 213 according to an embodiment may be integrally formed with the camera housing 211.

The slide motion controller 220 according to an embodiment of the disclosure may include a sliding plate 221, a rack gear rail 222, a locking hook 226, a locking guide 243, a hook cover 227, and/or a push rod 228. The rack gear rail 222, the locking hook 226, the locking guide 243, the hook cover 227, and/or the push rod 228 according to an embodiment may be disposed symmetrically at both sides based on the camera module unit 210.

The sliding plate 221 according to an embodiment of the disclosure may be coupled to the slide portion 230 to slide together and provide a space in which the rack gear rail 222 and the push rod 228 are disposed. At the end of the first direction of the sliding plate 221 according to an embodiment, the push rod 228 may be disposed, and at the end of the second direction thereof, a first guide slit 224 may be disposed. The push rod 228 according to an embodiment may transport a force to the camera module unit 210 in a sliding process of the slide portion 230. A first guide slit 224 according to an embodiment may include a first section 224a (see FIG. 3A) and a second section 224b (see FIG. 3A). The first section 224a may be formed to be diagonal to a width direction (e.g., the lateral direction of the electronic device, the x direction) of the rack gear rail 222 and to recede from the locking guide 243, and the second section 224b may be connected to the first section 224a and be extended in a longitudinal direction (e.g., y-axis direction) of the rack gear rail 222. The first guide slit 224 according to an embodiment may guide a moving direction of a first protrusion 226a of the locking hook 226 to be described later to release a contact state between the locking hook 226 and the locking guide 243.

The rack gear rail 222 according to an embodiment of the disclosure may be disposed in a direction (e.g., −y direction or first direction) in which the slide portion 230 slides. At one end (e.g., first direction or −y direction) of the rack gear rail 222 according to an embodiment, a gear 223 may be formed, and at the other end (e.g., second direction or y direction) of the rack gear rail 222, a second guide slit 225 may be formed. The gear 223 of the rack gear rail 222 according to an embodiment may engage with the pinion gear 213 of the camera module unit 210 to convert a force received through the push rod 228 to a rotational force, thereby rotating the camera module unit 210. An angle at which the camera module unit 210 rotates may be adjusted according to a length of the rack gear rail 222 or the number of gears according to an embodiment. The second guide slit 225 according to an embodiment is formed in a width direction (e.g., the lateral direction of the electronic device and the x-axis direction) of the rack gear rail 222; thus, the second guide slit 225 may guide the locking hook 226 protruded in the −x direction to return in the x direction.

The locking hook 226 according to the embodiment of the disclosure may be disposed at the other end of the rack gear rail 222. The locking hook 226 according to an embodiment may be disposed to protrude in a direction crossing a direction (e.g., y-axis direction) in which the rack gear rail 222 slides. The locking hook 226 according to an embodiment may be disposed on the same plane (e.g., xy plane) as that of the locking guide 243. When the locking hook 226 is protruded, the locking hook 226 may be coupled to the locking guide 243 to prevent the rack gear rail 222 from moving in the second direction. The coupling of the locking hook 226 and the locking guide 243 is not limited to coupling using physical coupling by fitting or latching or an attractive force by an electromagnetic force. For example, the coupling of the locking hook 226 and the locking guide 243 may mean a state in which a movement of the rack gear rail 222 is blocked by interference between the locking hook 226 and the locking guide 243 as the locking guide 243 is positioned on a movement path of the rack gear rail 222 including the locking hook 226.

The hook cover 227 according to an embodiment of the disclosure may cover the locking hook 226 and be coupled to the other end of the rack gear rail 222. In the hook cover 227, a third cover slit 227a may be formed in the same direction to correspond to a position of the second guide slit 225. The hook cover 227 may guide the locking hook 226 to protrude and return smoothly while preventing the locking hook 226 from being separated from the rack gear rail 222.

The locking guide 243 according to an embodiment of the disclosure may be disposed on the same plane (e.g., xy plane) as that of the locking hook 226. At a portion in contact with the locking hook 226, an inclined surface may be formed and, for example, a first inclined surface 243a in the y direction may be formed more smoothly than a second inclined surface 243b in the −y direction. When the rack gear rail 222 slides in the first direction (e.g., −y direction), the rack gear rail 222 may contact the first inclined surface 243a to move without great resistance, but when the rack gear rail 222 moves in the second direction (e.g., y direction), the rack gear rail 222 may contact the second inclined surface 243b (see FIG. 4) having a steep slope to receive large resistance to a slide movement of the rack gear rail 222. Therefore, the rack gear rail 222 may move in the second direction only when a contact state between the locking hook 226 and the locking guide 243 is released first. In a process in which the rack gear rail 222 slides in the second direction, a method of releasing the locking hook 226 and the locking guide 243 will be described later with reference to FIG. 8.

The slide portion 230 according to an embodiment of the disclosure may include an opening 231. For example, at an end portion of the slide portion 230 in the first direction (e.g., −y direction), the opening 231 may be formed in a z-axis direction. The opening 231 according to an embodiment may be formed to correspond to a size of the camera module unit 210, but it may be formed with a predetermined gap so as to minimize any friction during a rotation of the camera module unit 210. The camera module unit 210 according to an embodiment may be disposed in the opening 231. The camera module unit 210 according to an embodiment may rotate in the opening 231 using the pinion gear 213 as an axis thereof.

The slide driving unit (not illustrated) according to an embodiment of the disclosure may provide a necessary driving force when the slide portion 230 and the sliding motion controller 220 move in a first direction (e.g., −y direction) or a second direction (e.g., y direction). For example, the slide driving unit may use a motor, a worm, and a worm gear and use an actuator that performs a linear motion; and any power source capable of providing a driving force for driving the slide portion 230 may be freely applied to the slide driving unit.

The screen unit 240 according to an embodiment of the disclosure may include a display 241 (e.g., the display device 160 of FIG. 1). For example, the display 241 may be coupled to or be disposed adjacent to a touch detection circuit, a pressure sensor capable of measuring intensity (pressure) of a touch, and/or a digitizer for detecting a magnetic field stylus pen. Because no camera is disposed at the screen unit 240, the display 241 according to various embodiments of the disclosure may be implemented in a maximum area at a front surface of the electronic device 200.

The rear cover 250 according to an embodiment of the disclosure may cover a portion of the slide portion 230. For example, the opening 231 may be formed at the upper end in the −y direction of the slide portion 230 that is not covered by the rear cover 250. The slide portion 230 according to an embodiment may perform a slide motion between the screen unit 240 and the rear cover 250. The rear cover 250 according to an embodiment may be formed by, for example, coated or colored glass, ceramic, polymer, metal (e.g., aluminum, stainless steel (STS), or magnesium), or a combination of at least two of the above materials.

Figure 4:
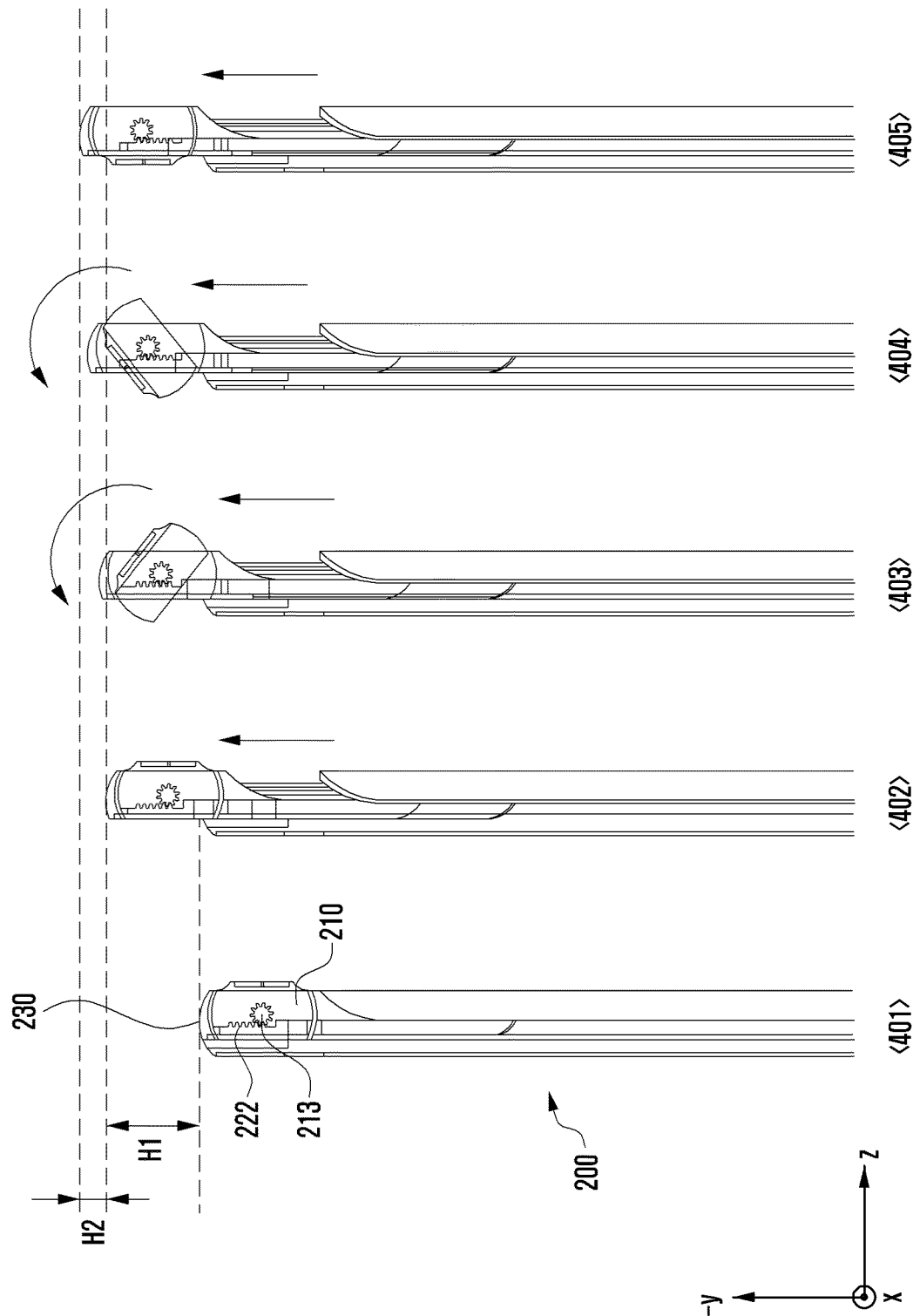
FIG. 4 is a side view illustrating an upward operation of a camera module unit according to an embodiment of the disclosure.

FIG. 4 is a side view illustrating an upward motion (e.g., moving in the −y direction of FIG. 2A) of the camera module unit 210 according to an embodiment of the disclosure.

With reference to FIG. 4, the camera module unit 210 may perform an upward motion and/or a rotation motion based on a user input (e.g., front photographing converting input or front photographing app execution). As the camera module unit 210 rotates, at least one camera included in the camera module unit 210 may be used as a front camera (e.g., self-camera).

According to an embodiment of the disclosure, in a state 401, the camera included in the camera module unit 210 may face a rear surface (e.g., third direction, first state) of the electronic device 200. In this case, the camera included in the camera module unit 210 may be used as a rear camera. This state may be referred to as a first state.

According to an embodiment of the disclosure, in a state 402, the camera module unit 210, the rack gear rail 222, and the slide portion 230 may perform an upward movement based on the user input. For example, the camera module unit 210, the rack gear rail 222, and the slide portion 230 may move by a first length H1. In the state 402, the rack gear rail 222 may be fixed by the locking hook 226 and the locking guide 243. This state may be referred to as a second state.

According to an embodiment of the disclosure, in states 403 to 405, the camera module unit 210 may perform an upward movement and a rotation movement. For example, in the states 403 to 405, the rack gear rail 222 may be fixed by the locking hook 226 and the locking guide 243, and only the camera module unit 210 and the slide portion 230 may move upward. The camera module unit 210 and the slide portion 230 according to an embodiment may move upward by a second length H2. The pinion gear 213 may rotate in engagement with the rack gear rail 222. Therefore, the camera module unit 210 may move in rotation. In a state 405, a camera included in the camera module unit 210 may face a front surface (e.g., fourth direction and third state) of the electronic device 200. In this case, the camera included in the camera module unit 210 may be used as a front camera. This state may be referred to as a third state.

Figure 5:
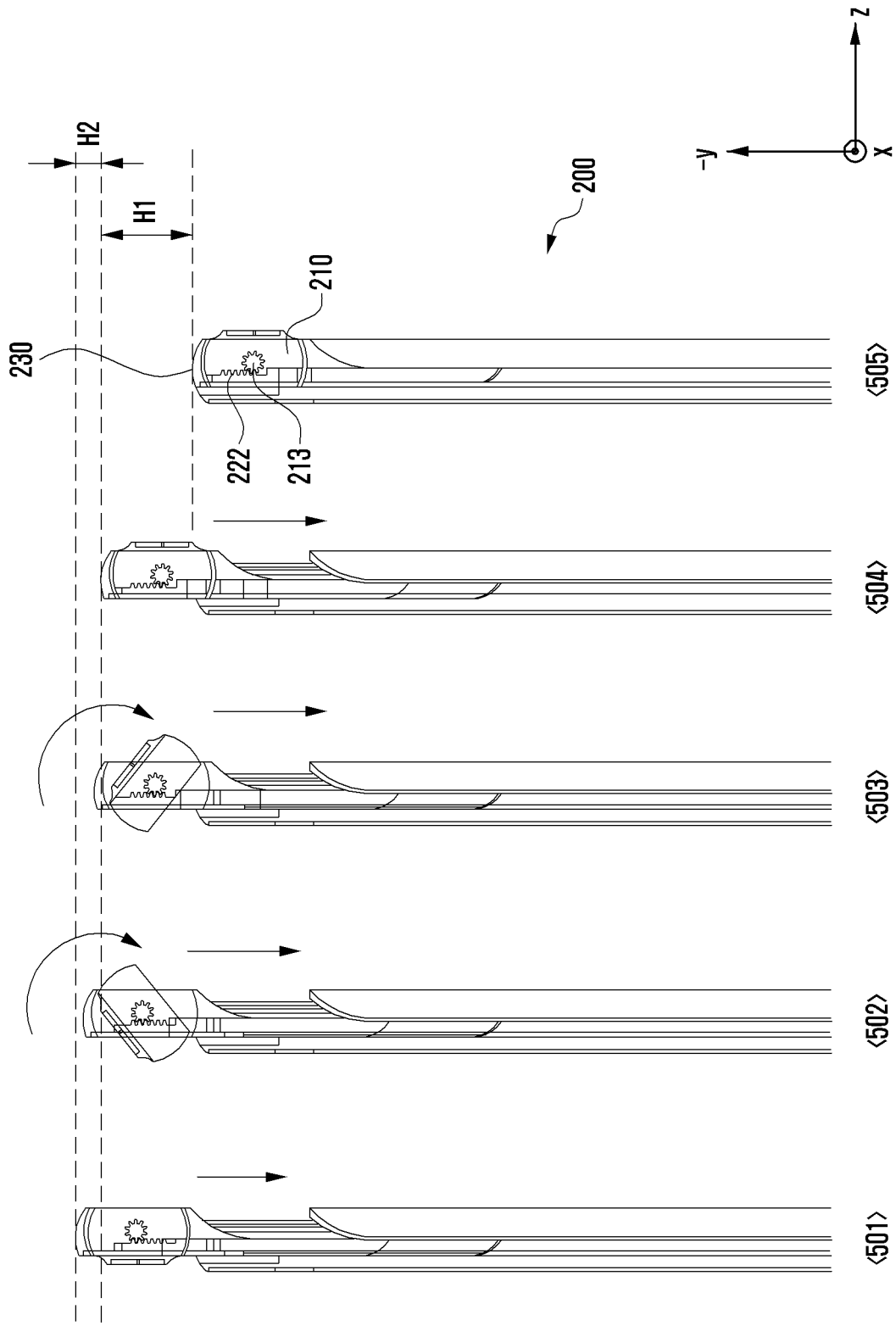
FIG. 5 is a side view illustrating a downward operation of a camera module unit according to an embodiment of the disclosure.

FIG. 5 is a side view illustrating a downward operation of the camera module unit 210 according to an embodiment of the disclosure.

With reference to FIG. 5, the camera module unit 210 may perform a downward operation or a rotation operation based on a user input (e.g., rear photographing switching input or photographing ending input). As the camera module unit 210 rotates, at least one camera included in the camera module unit 210 may be used as a rear camera.

According to an embodiment of the disclosure, in a state 501, the camera included in the camera module unit 210 may face a front surface (e.g., fourth direction and third state) of the electronic device 200. For example, the camera included in the camera module unit 210 may face a front surface of the electronic device 200 by a previously input user input (e.g., front photographing switching input or front photographing app execution).

According to an embodiment of the disclosure, in the states 501 to 503, the camera module unit 210 may perform a downward movement and/or a rotational movement. For example, in the states 501 to 503, a state may be maintained in which the rack gear rail 222 is fixed by the locking hook 226 and the locking guide 243, and only the camera module unit 210 and the slide portion 230 may move downward. The camera module unit 210 and the slide portion 230 may move downward by the second length H2. The pinion gear 213 may rotate in engagement with the rack gear rail 222. Therefore, the camera module unit 210 may move in rotation. In this process, an unexpected external force may be applied to the slide portion 230, and this force may be transferred to the rack gear rail 222; thus, when the rack gear rail 222 moves downward, the camera module unit 210 may be damaged while interfering with the screen unit 240 during a rotation thereof. As illustrated in FIG. 5, in the locking hook 226 and the locking guide 243 according to an embodiment of the disclosure, in a state in which the locking hook 226 is protruded, a movement of the locking guide 243 is physically limited in a second direction according to interference, and in the states 501 to 503, the rack gear rail 222 may be prevented from moving downward. In other words, in a state 504 in which a rotation of the camera module unit 210 is completed via the states 501 to 503, the slide portion 230 may move downward.

According to an embodiment of the disclosure, in the state 504, the camera included in the camera module unit 210 may face a rear surface (e.g., third direction and second state) of the electronic device 200. For example, in the state 504, the camera module unit 210, the rack gear rail 222, and the slide portion 230 may perform a downward movement together. In this case, a contact state between the locking hook 226 and the locking guide 243 may be released. The camera module unit 210, the rack gear rail 222, and the slide portion 230 may move by the first length H1. In the state 505, the camera module unit 210 may return to an original position (e.g., the state 401).

Figure 6:
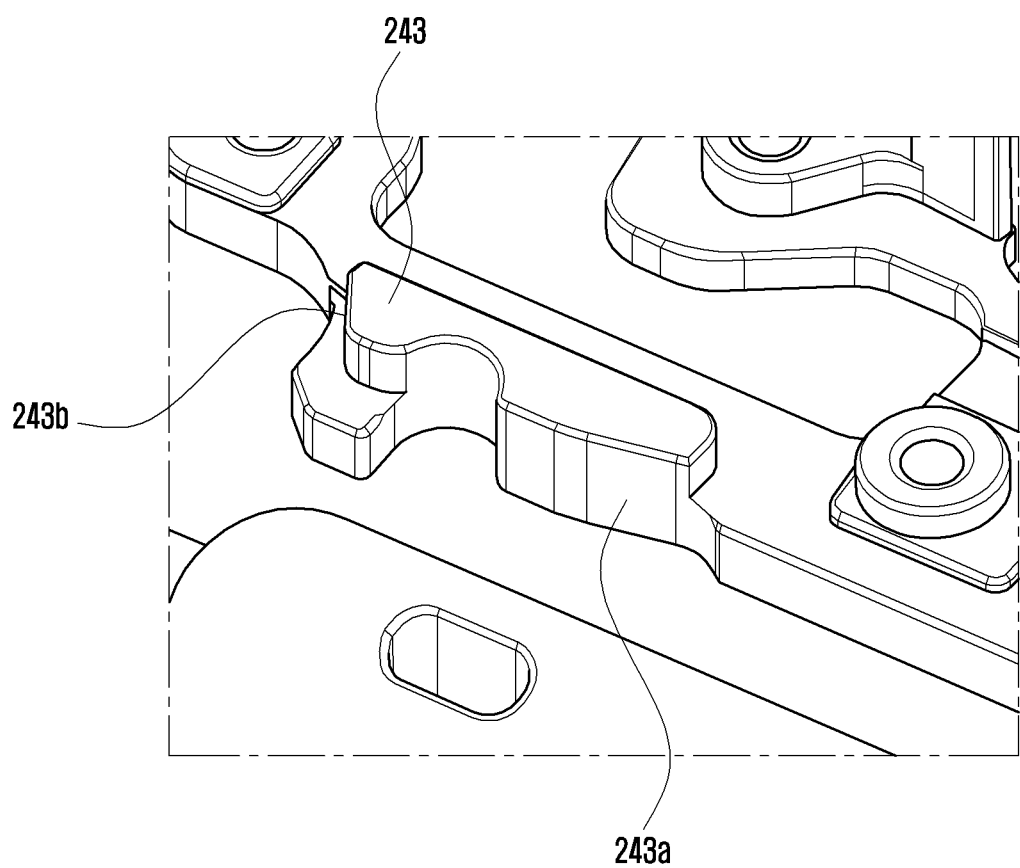
FIG. 6 is a diagram illustrating a locking guide according to an embodiment of the disclosure.
Figure 7:
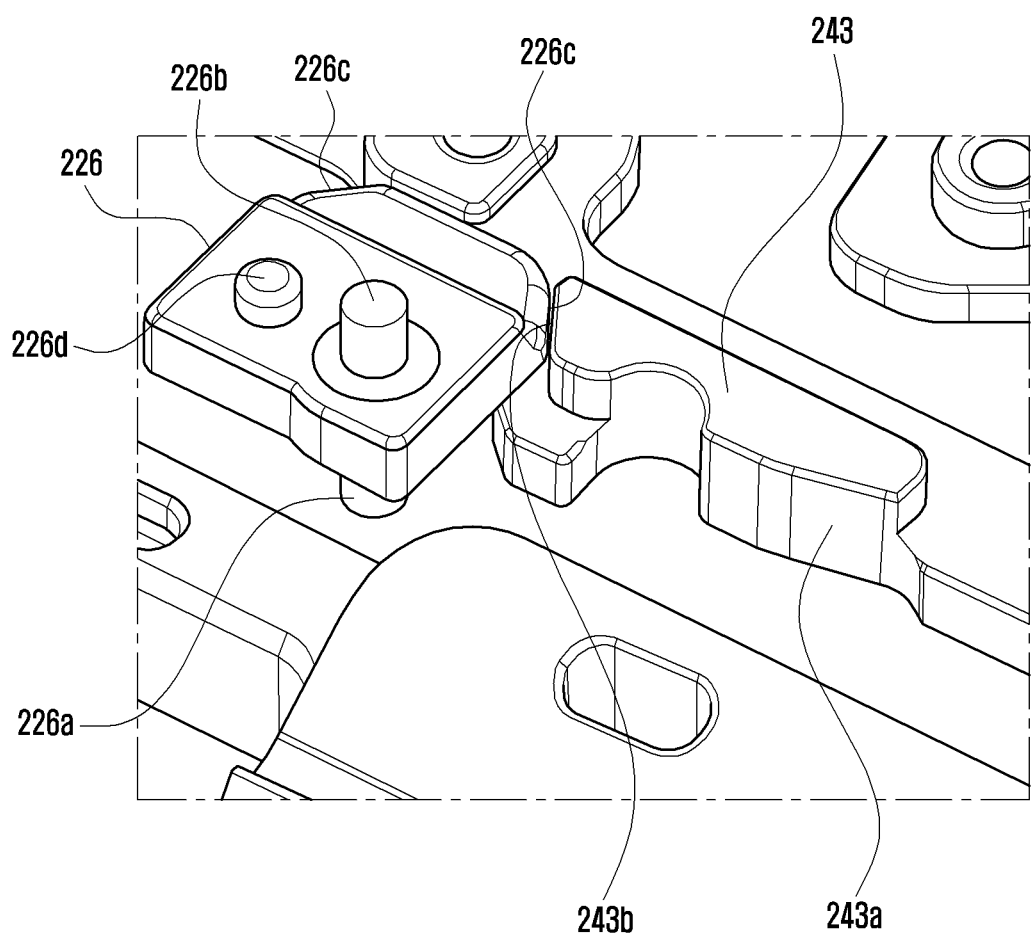
FIG. 7 is a diagram illustrating a locking hook according to an embodiment of the disclosure.

FIG. 6 is a diagram illustrating the locking guide 243 according to an embodiment of the disclosure, and FIG. 7 is a diagram illustrating a locking hook 226 together with a locking guide 243 according to an embodiment of the disclosure.

With reference to FIGS. 6 and 7, the locking hook 226 and the locking guide 243 according to an embodiment of the disclosure may be protruded toward each other on the same plane (e.g., xy plane) to be disposed to face each other. At the right side (e.g., y direction) of the locking guide 243 according to an embodiment, a first inclined plane 243a may be formed based on the illustrated state of FIG. 6 or 7, and at the left side of the locking guide 243, a second inclined plane 243b may be formed. The first inclined surface 243a may be formed more smoothly than the second inclined surface 243b. FIG. 7 illustrates a state (state 402 of FIG. 4) in which the rack gear rail 222 (see FIG. 3A) moves by a first length H1 (see FIG. 4) together with the slide portion 230 to be fixed by the locking hook 226 and the locking guide 243 or a state (states 501 to 503 of FIG. 5) in which the camera module unit 210 rotates before the slide portion 230 returns to an original state. In this state, as illustrated in FIG. 7, the inclined surface 226c of the locking hook 226 may come into contact with the second inclined surface 243b of the rocking guide 243 having a steep slope to provide large resistance to a slide movement of the rack gear rail 222.

Therefore, when a contact state of the locking hook 226 and the locking guide 243 is released first, the rack gear rail 222 may slide smoothly in the second direction.

With reference to FIG. 7, at an end portion in the y direction of the locking hook 226 according to an embodiment of the disclosure, an inclined surface 226c may be formed. In the inclined surface 226c, a process may be performed smoothly in which the locking hook 226 slides together with the rack gear rail 222 (see FIG. 3A) and contacts the first inclined surface 243a or the second inclined surface 243b of the locking guide 243 to couple to or release from the first inclined surface 243a or the second inclined surface 243b.

In the locking hook 226 according to an embodiment of the disclosure, a first protrusion 226a and a second protrusion 226b may be formed. The first protrusion 226a according to an embodiment may be protruded toward a front surface (e.g., −z direction) of the electronic device 200 and be inserted into the first guide slit 224 (see FIG. 8) and the second guide slit 225 (see FIG. 8) to guide protrusion and return of the locking hook 226. In other words, the first protrusion 226a may move in the y-axis direction along the second section 224b of the first guide slit 224, and move in the x-axis direction along the second guide slit 225 and the first section 224a of the first guide slit 224. The second protrusion 226b according to an embodiment may be protruded toward the rear surface (e.g., z direction) of the electronic device 200, which is a direction opposite to that of the first protrusion 226a, and be inserted into a third guide slit 227a (see FIG. 8) to guide smooth protrusion and return of the locking hook 226. A third protrusion 226d according to an embodiment may protrude in the same direction as that of the second protrusion 226b and be inserted into a fourth guide slit 227b (see FIG. 3A) formed in parallel with the third guide slit 227a. The locking hook 226 may be prevented from rotating about the second protrusion 226b in a process of protruded and returning.

Figure 8:
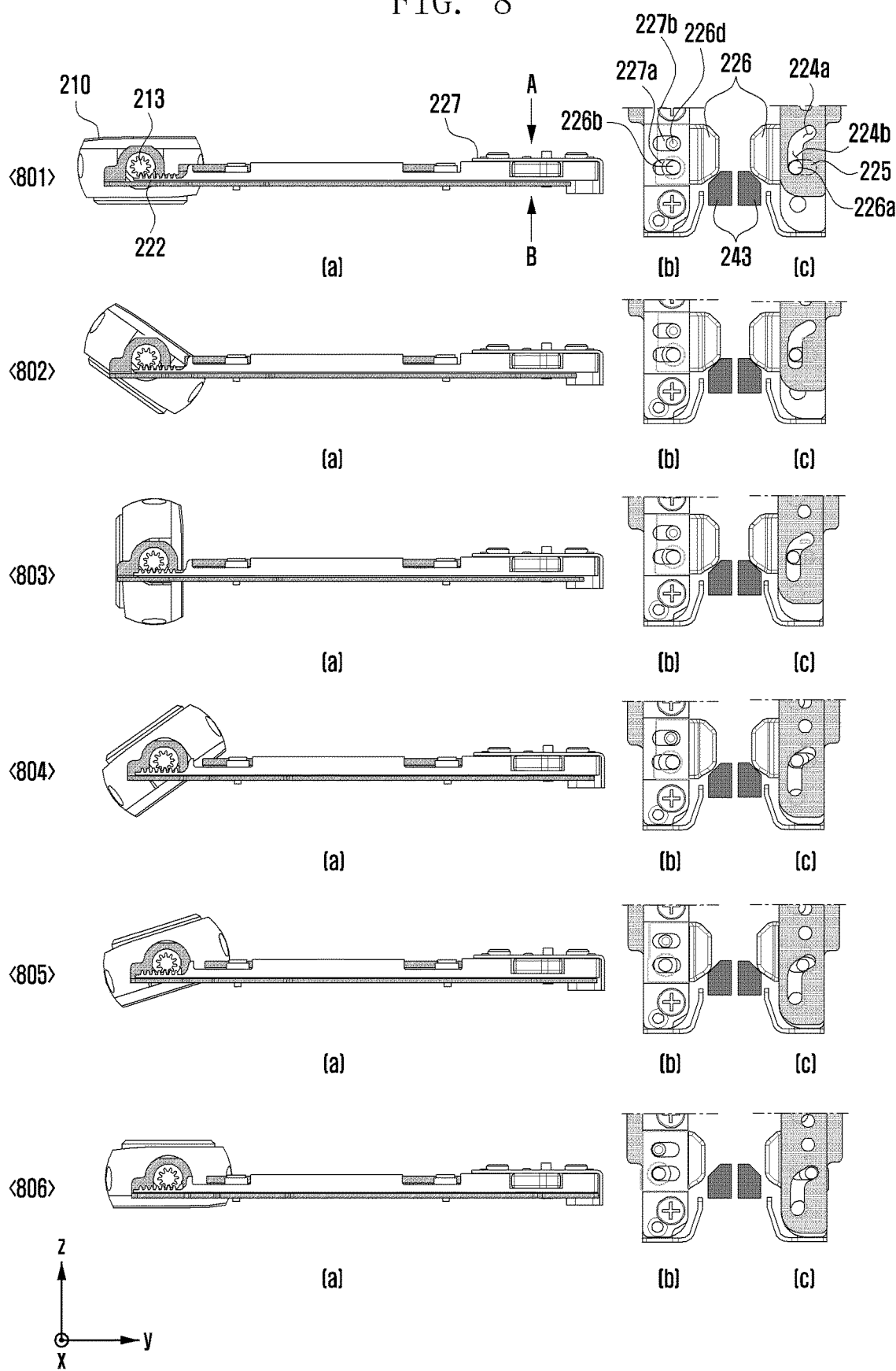
FIG. 8 is a diagram illustrating an operation of releasing a locking hook and a locking guide in a downward operation of a camera module unit according to an embodiment of the disclosure.

FIG. 8 is a diagram illustrating an operation of releasing a contact state of the locking hook 226 and the locking guide 243 in a downward operation of the camera module unit 210 according to an embodiment of the disclosure. For example, states 801 to 806 are illustrated by subdividing a movement of the locking hook 226 and the locking guide 243 in the states 501 to 504 of FIG. 5.

With reference to the state 801 of FIG. 8, 801-b is a diagram illustrating 801-a viewed in a direction A, and 801-c is a diagram illustrating 801-a viewed in a direction B. The up and down direction based on an illustrated state of 801-a may be a direction (e.g., −z direction) in which the lower side faces the front surface of the electronic device in the z-axis direction, the left and right direction based on an illustrated state of 801-b and 801-c may indicate the x-axis direction (see FIG. 2A), and the up and down direction may indicate the y-axis direction (see FIG. 2A).

With reference to 801-c of the state 801 of FIG. 8, the first guide slit 224 according to an embodiment of the disclosure may include a first section 224a and a second section 224b. The first section 224a according to an embodiment may be formed to be diagonal to a width direction (e.g., x-axis direction) of the rack gear rail 222 and to recede from the locking guide 243. According to an embodiment, the second section 224b may be connected to the first section 224a and be extended in a longitudinal direction (e.g., y-axis direction) of the rack gear rail 222. Coupling and release of the locking hook 226 and the locking guide 243 may be implemented by the first section 224a of the first guide slit 224.

A length of the first guide slit 224 in the y-axis direction according to an embodiment may correspond to a second length H2.

When the camera module according to an embodiment of the disclosure rotates toward a rear surface of the electronic device, in the states 801 to 803 in which an amount of rotation is much, the first protrusion 226a of the locking hook 226 moves only in the second section 224b of the first guide slit 224; thus, a state may be maintained in which the locking hook 226 and the locking guide 243 are coupled to each other.

In the state 804, at a time point in which the first hook 226a of the locking hook 226 starts to enter the first section 224a of the first guide slit 224, release of a contact state of the locking hook 226 and the locking guide 243 may be started.

In the state 805, the first protrusion 226a of the locking hook 226 moves (e.g., the locking hook 226 may return toward the rack gear rail 222 and move in the x direction) in a direction of receding the locking hook 226 from the guide slit while the first protrusion 226a moves in the first section 224a of the first guide slit 224; thus, release of a contact state between the locking hook 226 and the locking guide 243 may be started.

In the state 806, a movement of the first protrusion 226a of the locking hook 226 is completed within the first section 224a of the first guide slit 224, and a contact state of the locking hook 226 and the locking guide 243 may be released completely. Accordingly, the slide portion 230 may move freely as much as the first length H1 from the state 504 to the state 505 of FIG. 5.

Figure 9:
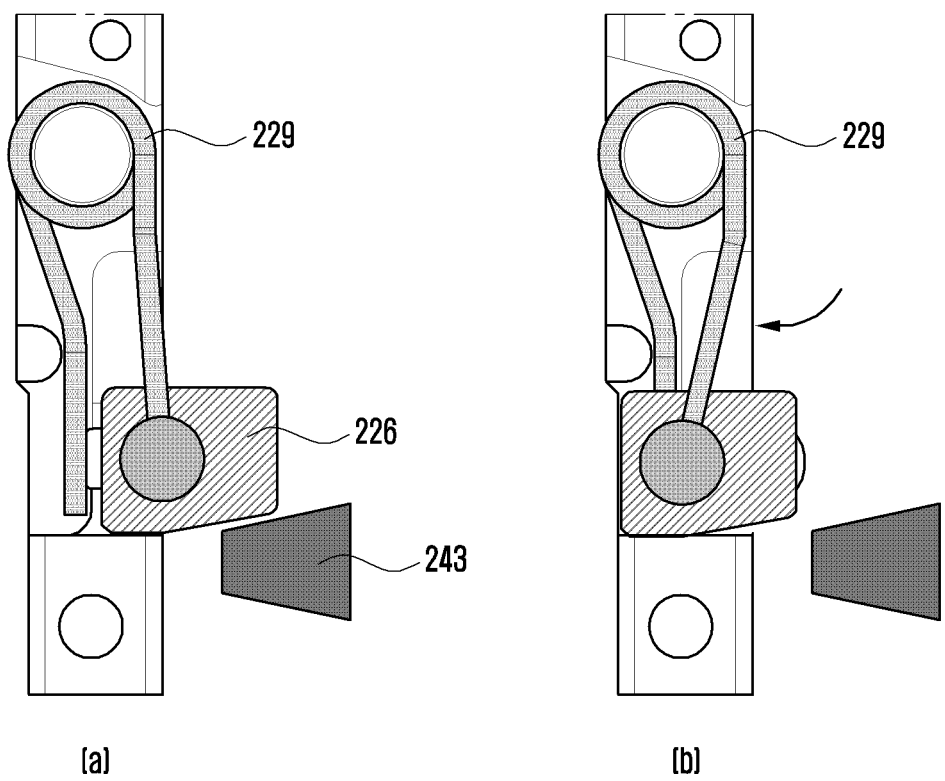
FIG. 9 is a diagram illustrating a torsion spring for releasing a locking hook and a locking guide according to another embodiment of the disclosure.

FIG. 9 is a diagram illustrating a torsion spring 229 for releasing a contact state of the locking hook 226 and the locking guide 243 according to another embodiment of the disclosure.

In the embodiment of FIG. 8, a contact state between the locking hook 226 and the locking guide 243 is gradually released through the first section 224a of the first guide slit 224 formed diagonally, but the embodiment of FIG. 9 is different in that a contact state of the locking hook 226 and the locking guide 243 is instantaneously released by an elastic force of the torsion spring 229.

By approaching a state 806 in which a rotation of the camera module unit 210 is almost completed by quickly changing the states 805 and 806, the locking hook 226 and the locking guide 243 may be released. Thereby, the slide portion 230 may be fixed until immediately before a rotation of the camera module unit 210 is completed.

By enabling one camera module to perform a function of a front camera and a rear camera, an electronic device according to various embodiments of the disclosure may maximize the display of the electronic device.

The locking hook and the locking guide according to various embodiments of the disclosure limit a movement of the slide portion by a physical locking structure, and in a process of switching to the front camera and the rear camera, even when an unexpected external force is applied, the slide portion may be fixed and the module unit may rotate without interfering with a peripheral structure.

The electronic device 200 according to an embodiment of the disclosure may include a housing; a display 241 received in the housing and exposed through a portion of the housing; a slide portion 230 including an opening 231 exposed to the outside and configured to slide with respect to the housing; a camera module unit 210 disposed at the opening 231, configured to rotate within the opening 231, and configured to rotate in association with an operation of the slide portion 230; and a sliding motion controller 220 configured to implement a slide operation of the slide portion 230 and a rotation operation of the camera module unit 210, wherein the sliding motion controller 220 includes a sliding plate 221 coupled to the slide portion 230 to slide together, a rack gear rail 222 disposed in a sliding direction of the slide portion 230 and configured to move together with the slide portion 230 by a first length and having a gear 223 formed at one end thereof, a locking hook 226 protruded from the other end of the rack gear rail 222 so as to intersect a sliding direction of the rack gear rail 222, and a locking guide 243 formed to correspond to a position of the locking hook 226 and coupled to the locking hook 226.

The slide portion 230 may include a first state in which the camera module unit 210 is positioned to overlap with the display 241, a second state from movement by a first length in a first direction toward an arbitrary edge of the display 241 in the first state, and a third state from movement by a second length in the first direction in the second state.

When the slide portion 230 moves from the first state to the second state, the sliding plate 221, the rack gear rail 222, and the locking hook 226 of the sliding motion controller 220 may move together, and the locking hook 226 and the locking guide 243 may be coupled to each other to fix the rack gear rail 222.

When the slide portion 230 moves from the second state to the third state, the sliding plate 221 of the sliding motion controller 220 may move and the camera module unit 210 may rotate.

The camera module unit 210 may face a third direction in the first state and the second state, face a fourth direction in the third state, and rotate toward a fourth direction different from the third direction when switching from the second state to the third state.

The third direction and the fourth direction may be opposite to each other.

In the sliding plate 221, a first guide slit 224 including a first section 224a formed diagonally in a width direction of the rack gear rail 222 and a second section 224b formed in a longitudinal direction of the rack gear rail 222 may be formed; at the other end of the rack gear rail 222, a second guide slit 225 may be formed in a width direction of the rack gear rail 222; and in the locking hook 226, a first protrusion 226a inserted into the first guide slit 224 and the second guide slit 225 to move may be formed.

When the slide portion 230 moves from the third state to the second state, a second protrusion 226b of the locking hook 226 may move along the second section 224b of the second guide slit 225 and release the locking hook 226 from the locking guide 243.

The locking guide 243 may have a first inclined surface 243a formed to gradually approach the rack gear rail 222 in the first direction.

The locking guide 243 may have a second inclined surface 243b formed to gradually recede from the rack gear rail 222 in the second direction and to have a steeper slope than that of an inclined surface of the first direction.

In an end potion of the first direction of the locking hook 226 and an end potion of the second direction opposite to the first direction, an inclined surface 226c may be formed to correspond to an inclined surface of the locking guide 243.

The electronic device may further include a slide drive unit configured to provide a driving force to an operation of the slide portion.

The camera module unit 210 may include a camera housing 211 including at least one camera device and a pinion gear 213 formed along a rotation axis of the camera housing 211 and configured to engage with a gear 223 of the rack gear rail 222.

The sliding motion controller 220 may further include a push rod 228 having one side fixed to the sliding plate 221 and the other side connected to the camera module unit 210, wherein the camera module unit 210 may further include an extension portion 215 protruded from the camera housing 211 and formed in a shaft between the pinion gears 213 and configured to receive a force in contact with the push rod 228 to rotate in a rotation hole of the slide portion, and wherein the push rod 228 may push the camera module unit 210 by a second length in a process of moving from the second state to the third state.

When the push rod 228 exerts a force on the extension portion 215, the pinion gear 213 may rotate on the gear 223 of the rack gear rail 222 to rotate the camera module unit 210.

An electronic device 200 according to an embodiment of the disclosure may include a housing including a first surface 240 facing in a fourth direction (e.g., −z direction) and a second surface 250 facing in a third direction (e.g., z direction) opposite to the fourth direction (e.g., −z direction), wherein the first surface 240 includes a first side having a substantially quadrangular shape and extended in a x-axis direction and having a first length and a second side extended in a y-axis direction substantially perpendicular to the x-axis direction and having a second length, and the second surface 250 includes a third side having a quadrangular shape having an area smaller than that of the quadrangle and parallel to the first side and having the first length and a fourth side parallel to the second side and having a third length smaller than the second length; a display 241 disposed inside the housing and visible through the first surface 240; a camera structure 210 slidable in the y-axis direction between a first position and a second position, wherein the camera structure includes a third surface 231 forming a surface substantially extended to the second surface 250, wherein the third surface 231 includes a fifth side substantially aligned with or adjacent to the first side, and a sixth side substantially in contact with or adjacent to the third side when viewed from above the second surface 250 at the first position; at least one image sensor 216 facing in the third direction at the first position and rotatable to face in the fourth direction at the second position, wherein the first side is positioned between the third side and the fifth side at the second position when viewed from above the second surface 250; a drive structure disposed inside the housing and configured to move the camera structure 210 in the y-axis direction; a first pinion gear 213 coupled to the camera structure 210 while being rotatable along a first path in the y-axis direction; a first rack gear 223 engaged with the first pinion gear 213 while being extended along the first path; a first shaft 222 coupled to or integrally formed with the first rack gear 223 while being extended in the y-axis direction; a first hook member 226 connected to the first shaft 222 while being movable in the x-axis direction with respect to the first shaft 222, wherein the first hook member 226 includes a first structure protruded from an area of the first shaft 222 in the x-axis direction and a second structure 226b protruded in the fourth direction or the third direction when viewed from the second surface 250; and a first rail structure coupled to the camera structure 210 and configured to slidably receive the first shaft 222, wherein the first rail structure includes a first guide structure 224 configured to guide the second structure 226b such that the first hook member 226 first moves in the y-axis direction and then moves in the x-axis direction while the camera structure 210 moves from the second position to the first position.

The screen unit 240 according to an embodiment may be a concept of collectively referring to both the first surface and the display 241. The third surface according to an embodiment is a portion corresponding to an area difference between the slide portion 230 and the rear cover 250 and may correspond to the opening 231 area. The rack gear rail 222 according to an embodiment may be a concept including both the first rack gear 223 and the first shaft 222.

The electronic device may further include a first stopper 243 in contact with the first structure at the second position, and while the camera structure 210 moves from the second position to the first position, the first structure may be first stopped by the first stopper 243 while the first rail structure moves in the y-axis direction, and the first structure may move in the x-axis direction while the first rail structure further moves in the y-axis direction.

The first hook member 226 may further include a third structure 226a protruded in an opposite direction from the second structure 226b, and while the camera structure 210 further moves from the second position to the first position, the first shaft 222 may contact the first stopper 243 and thus may include a second guide structure for guiding the third structure 226a so that the first hook member 226 moves in the x-axis direction with respect to the first shaft 222.

The first guide structure 224 may include first openings 224a and 224b including a first portion 224b extended in the y-axis direction and a second portion 224a extended in a direction forming an acute angle with the y-axis direction, and the second structure 226b may move within the first openings 224a and 224b.

The second guide structure may include a second opening 227a extended in the x-axis direction, and the third structure 226a may move in the second opening 227a.

The second length may be longer than the first length.

The embodiments of the disclosure disclosed in this specification and drawings only present a specific example in order to easily describe the technical contents according to an embodiment of the disclosure and to help an understanding of the embodiments of the disclosure, and they do not intend to limit the scope of the embodiments of the disclosure. Accordingly, all changes or modifications derived from the technical idea of various embodiments of the disclosure in addition to the embodiments described herein should be construed as being included in the scope of various embodiments of the disclosure without departing from the scope of the disclosure.

What is claimed is:

1. An electronic device, comprising:
a housing;
a display received in the housing and exposed through a portion of the housing;
a slide portion comprising an opening exposed to the outside and configured to slide with respect to the housing;
a camera module unit disposed at the opening, configured to rotate within the opening, and to rotate in association with an operation of the slide portion; and
a sliding motion controller configured to implement a slide operation of the slide portion and a rotation operation of the camera module unit,
wherein the sliding motion controller comprises:
a sliding plate coupled to the slide portion to slide together;
a rack gear rail disposed in a sliding direction of the slide portion and configured to move together with the slide portion by a first length and having a gear formed at one end thereof;
a locking hook protruded from the other end of the rack gear rail so as to intersect a sliding direction of the rack gear rail; and
a locking guide formed to correspond to a position of the locking hook and coupled to the locking hook.

2. The electronic device of claim 1, wherein the slide portion comprises:
a first state in which the camera module unit is positioned to overlap with the display;
a second state from movement by a first length in a first direction toward an arbitrary edge of the display in the first state; and
a third state from movement by a second length in the first direction in the second state.

3. The electronic device of claim 2, wherein, when the slide portion moves from the first state to the second state, the sliding plate, the rack gear rail, and the locking hook of the sliding motion controller move together, and the locking hook and the locking guide are coupled to each other to fix the rack gear rail.

4. The electronic device of claim 3, wherein, when the slide portion moves from the second state to the third state, the sliding plate of the sliding motion controller moves and the camera module unit rotates.

5. The electronic device of claim 4, wherein the camera module unit faces a third direction in the first state and the second state, faces a fourth direction in the third state, and rotates toward a fourth direction different from the third direction when switching from the second state to the third state.

6. The electronic device of claim 5, wherein the third direction and the fourth direction are opposite to each other.

7. The electronic device of claim 2, wherein in the sliding plate, a first guide slit comprising a first section formed diagonally in a width direction of the rack gear rail and a second section formed in a longitudinal direction of the rack gear rail is formed,
at the other end of the rack gear rail, a second guide slit is formed in a width direction of the rack gear rail, and
in the locking hook, a first protrusion inserted into the first guide slit and the second guide slit to move is formed.

8. The electronic device of claim 7, wherein, when the slide portion moves from the third state to the second state, a second protrusion of the locking hook moves along the second section of the second guide slit and releases the locking hook from the locking guide.

9. The electronic device of claim 8, wherein the locking guide has a first inclined surface formed to gradually approach the rack gear rail in the first direction.

10. The electronic device of claim 9, wherein the locking guide has a second inclined surface formed to gradually recede from the rack gear rail in the second direction and to have a steeper slope than that of an inclined surface of the first direction.

11. The electronic device of claim 9, wherein in an end potion of the first direction of the locking hook and an end potion of the second direction opposite to the first direction, an inclined surface is formed to correspond to an inclined surface of the locking guide.

12. The electronic device of claim 1, wherein a driving force is provided to operate the slide portion.

13. The electronic device of 2, wherein the camera module unit comprises:
a camera housing comprising at least one camera device; and at least one pinion gear formed along a rotation axis of the camera housing and configured to engage with a gear of the rack gear rail.

14. The electronic device of claim 13, wherein the sliding motion controller further comprises a push rod having one side fixed to the sliding plate and the other side connected to the camera module unit,
wherein the camera module unit further comprises an extension portion protruded from the camera housing and formed in a shaft between the at least one pinion gear and configured to receive a force in contact with the push rod to rotate in a rotation hole of the slide portion, and
wherein the push rod pushes the camera module unit by a second length in a process of moving from the second state to the third state.

15. The electronic device of claim 14, wherein the at least one pinion gear rotates on the gear of the rack gear rail to rotate the camera module unit, when the push rod exerts a force on the extension portion.

16. An electronic device, comprising:
a housing comprising a first surface facing in a first direction and a second surface facing in a second direction opposite to the first direction,
wherein the first surface comprises a first side having a substantially quadrangular shape and extended in a third direction and having a first length and a second side extended in a fourth direction substantially perpendicular to the third direction and having a second length, and
wherein the second surface comprises a third side having a quadrangular shape having an area smaller than that of the quadrangle and parallel to the first side and having the first length and a fourth side parallel to the second side and having a third length smaller than the second length;
a display disposed inside the housing and visible through the first surface; and
a camera structure slidable in the fourth direction between a first position and a second position,
wherein the camera structure comprises:
a third surface forming a surface substantially extended to the second surface,
wherein the third surface comprises:
a fifth side substantially aligned with or adjacent to the first side, and
a sixth side substantially in contact with or adjacent to the third side when viewed from above the second surface at the first position,
wherein at least one image sensor faces in the second direction at the first position and rotatable to face in the first direction at the second position,
wherein the first side is positioned between the third side and the fifth side at the second position when viewed from above the second surface;
wherein the camera structure is configured to move in the fourth direction,
wherein a first pinion gear is configured to couple to the camera structure while being rotatable along a first path in the fourth direction,
wherein a first rack gear is configured to engage with the first pinion gear while being extended along the first path,
wherein a first shaft is configured to couple to or integrally formed with the first rack gear while being extended in the fourth direction,
wherein a first hook member is configured to connect to the first shaft while being movable in the third direction with respect to the first shaft,
wherein the first hook member comprises a first structure protruded from an area of the first shaft in the third direction and a second structure protruded in the first direction or the second direction when viewed from the second surface, and
wherein a first rail structure is configured to couple to the camera structure and slidably receive the first shaft, and
wherein the first rail structure comprises a first guide structure configured to guide the second structure such that the first hook member first moves in the fourth direction and then moves in the third direction while the camera structure moves from the second position to the first position.

17. The electronic device of claim 16, further comprising a first stopper in contact with the first structure at the second position,
wherein, while the camera structure moves from the second position to the first position, the first structure is first stopped by the first stopper while the first rail structure moves in the fourth direction, and the first structure moves in the third direction while the first rail structure further moves in the fourth direction.

18. The electronic device of claim 16, wherein the first hook member further comprises a third structure protruded in an opposite direction from the second structure, and
wherein the first shaft contacts the first stopper while the camera structure further moves from the second position to the first position, and the first hook member comprises a second guide structure configured to guide the third structure so as to move in the third direction with respect to the first shaft.

19. The electronic device of claim 18, wherein the first guide structure comprises a first opening comprising a first portion extended in the fourth direction and a second portion extended in a direction forming an acute angle with the fourth direction, and the second structure moves within the first opening.

20. The electronic device of claim 19, wherein the second guide structure comprises a second opening extended in the third direction, and the third structure moves within the second opening.

* * * * *